(12) United States Patent
Bruhnke et al.

(10) Patent No.: US 8,336,943 B2
(45) Date of Patent: Dec. 25, 2012

(54) SUN VISOR WITH PLASTIC MIRROR

(75) Inventors: Ulrich Bruhnke, Ehningen (DE); Kurt Wilfinger, Affalterback (DE)

(73) Assignee: SMR Patents S.a.r.l., Luxembourg (LU)

(*) Notice: Subject to any disclaimer, the term of this patent is extended or adjusted under 35 U.S.C. 154(b) by 50 days.

(21) Appl. No.: 12/410,594

(22) Filed: Mar. 25, 2009

(65) Prior Publication Data
US 2009/0243330 A1 Oct. 1, 2009

(30) Foreign Application Priority Data
Mar. 25, 2008 (EP) .................................. 08102897

(51) Int. Cl.
*B60J 3/02* (2006.01)
(52) U.S. Cl. ..................... 296/97.1; 296/97.2; 296/97.5; 296/97.11
(58) Field of Classification Search ................. 296/97.1, 296/97.5, 97.6, 97.8, 97.9, 97.11, 97.12, 296/97.13, 97.2
See application file for complete search history.

(56) References Cited

U.S. PATENT DOCUMENTS

| | | | | |
|---|---|---|---|---|
| 3,343,867 A | * | 9/1967 | Couch et al. ................. | 296/97.9 |
| 4,685,723 A | * | 8/1987 | Canadas ....................... | 296/97.5 |
| 4,858,983 A | * | 8/1989 | White et al. ................ | 296/97.13 |
| 4,948,240 A | * | 8/1990 | Zipperle ........................ | 359/844 |
| 4,988,180 A | * | 1/1991 | Gabas .......................... | 359/844 |
| 5,061,004 A | * | 10/1991 | Happich et al. .............. | 296/97.5 |
| 5,238,163 A | * | 8/1993 | Leach et al. ..................... | 224/312 |
| 5,316,362 A | * | 5/1994 | McGuinness ................ | 296/97.9 |
| 5,678,879 A | * | 10/1997 | Mailander et al. ........... | 296/97.1 |
| 6,012,757 A | * | 1/2000 | Viertel et al. ................ | 296/97.2 |
| 2001/0035256 A1 | * | 11/2001 | Hall et al. ..................... | 156/212 |
| 2003/0001301 A1 | * | 1/2003 | Duroux et al. ............... | 264/40.5 |
| 2005/0134078 A1 | * | 6/2005 | Iwatsuka et al. ............. | 296/97.2 |
| 2006/0061127 A1 | * | 3/2006 | Emerling et al. ............ | 296/97.1 |
| 2006/0113819 A1 | * | 6/2006 | Remy ........................ | 296/97.11 |

FOREIGN PATENT DOCUMENTS

| | | |
|---|---|---|
| DE | 10153154 | 5/2003 |
| FR | 2431932 | 2/1980 |
| FR | 0076174 | 4/1983 |
| GB | 2009022 | 6/1979 |
| WO | 2006080124 | 8/2006 |

OTHER PUBLICATIONS

European Search Report for EP 08 10 2897 dated Jul. 16, 2008.

* cited by examiner

*Primary Examiner* — Glenn Dayoan
*Assistant Examiner* — Sunsurraye Westbrook
(74) *Attorney, Agent, or Firm* — Reising Ethington P.C.

(57) ABSTRACT

A sun visor, comprising at least one mirror surface integrated in the sun visor body is proposed, wherein the sun visor body comprises a receiver for at least one mirror. The mirror comprises a support made of plastic glass, wherein guide elements for means for concealing the at least one mirror in the sun visor body are integrally molded at said support.

8 Claims, 5 Drawing Sheets

SUN VISOR WITH PLASTIC MIRROR

BACKGROUND OF THE INVENTION

The invention is based on a priority patent application EP 08102897.9 which is hereby incorporated by reference.

The invention relates to a sun visor for vehicles, comprising a mirror, which is recessed in a depression of the sun visor body, and a mirror cover, which can be operated manually. The mirror is comprised of a plastic glass with integrated support elements. The cover of the mirror is thus e.g. a slider made of plastic, which comprises a handle rail on the side facing away from the mirror, and which engages respective groove type guides with each of its rims extending in linear movement direction.

STATE OF THE ART

In current sun visors, comprising a mirror cover configured as a slide, the slide is guided by its rims extending in linear movement direction in U-shaped or V-shaped guides. The U-shaped guides cause surface contact on three sides in the upper and lower guide portion of the slide, which makes controllable and manageable sliding of the slide in the guides more difficult. Typically, the components, this means the slide and the guides are produced with a very large dimensional tolerance, in order to still be able to operate the slide, also when large temperature changes occur. This relatively large tolerance clearance, however, often leads to customer complaints, since the slide can thus slide unintentionally and, which is even less desirable, can develop into a quite annoying source of noise by causing rattling noises. In order to accomplish an improved sliding of the slide in the U-shaped guides, metal springs were already disposed at the rims of the slide, wherein said rims extend in the direction of the linear movement, wherein said metal springs were not able to stop the annoying rattling noises. A further improvement was accomplished by DE 10 164 887 through a V-shaped groove.

For covering mirrors in sun visors cover flaps are also known. In DE 44 40 606, e.g. a cover plate is described, which is disposed in an integrally formed lug of the mirror frame.

SUMMARY OF THE INVENTION

The problem of reliably guiding a cover like a slide, or a cover flap is even more pronounced when using different materials with different thermal expansion coefficients. Thus, it is the object of the invention to solve this problem and to provide a sun visor, which is comprised of plastic materials and few elements made of metal.

In order to achieve this object, it is proposed according to the invention to provide a sun visor 1, comprising at least one integrated mirror surface in the sun visor body 2, wherein the sun visor body 2 comprises a receiver for the mirror 15, and said mirror 15 comprises a carrier made of plastic glass, at which carrier guide elements 17 for means for concealing the at least one mirror in the sun visor body 2 are directly integrally molded.

By using plastic glass, the configuration of the sun visor is greatly simplified, and the problem of different thermal expansion of different materials is reduced. The risk of injury at a fractured glass mirror in the sun visor is eliminated and the plastic glass material facilitates new designs and configuration options.

It is advantageous in particular, that flat and any type of cambered mirrors can be produced using plastic glass, so that a flat mirror can be replaced by a mirror with a flat or concave portion without additional complexity.

Through the measures according to the invention, a significant quality improvement is achieved in a simple and cost effective manner.

BRIEF DESCRIPTION OF THE DRAWINGS

An embodiment of the invention is subsequently described in more detail with reference to the drawings, wherein the figures show the following.

DETAILED DESCRIPTION OF THE DRAWINGS

Figure 1:
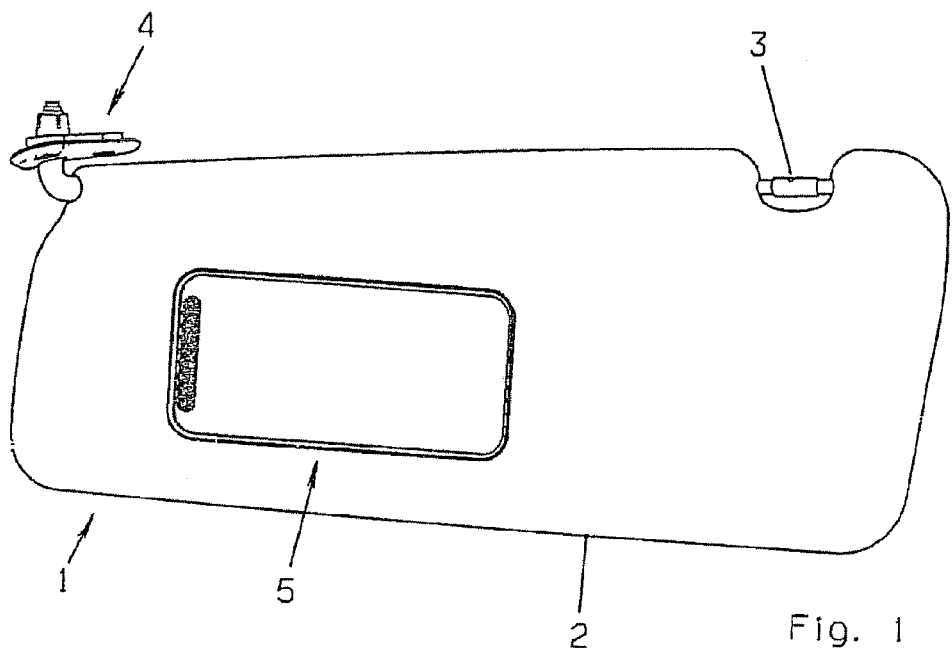
FIG. 1 a sun visor.

FIG. 1 illustrates a complete sun visor 1, comprised of a covered sun visor body 2, comprising a support pin 3, a mounted bolt down unit 4, and a mirror system 5, integrated in the sun visor body 2.

The first embodiment illustrates a sun visor with a slide, which is disposed movable on top of a mirror. For using the mirror, the slide is moved to the right by its handle rail, and the concealed mirror becomes visible.

Figure 2:
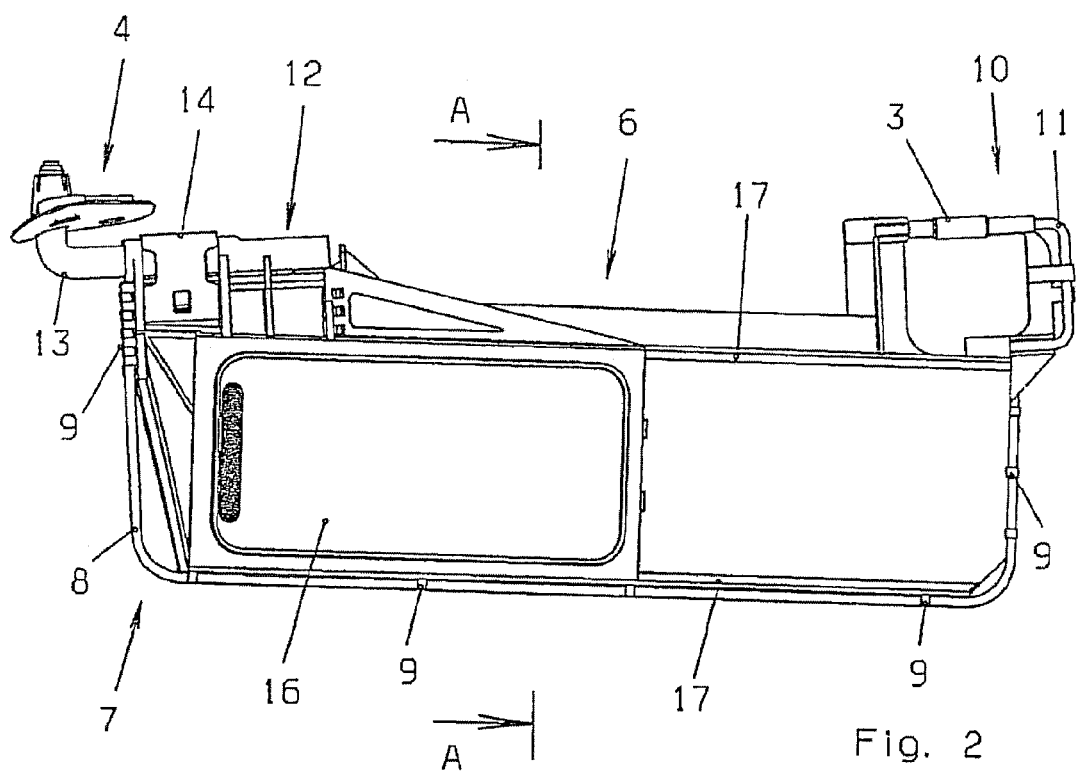
FIG. 2 a reinforcement insert for the sun visor according to FIG. 1.
Figure 3:
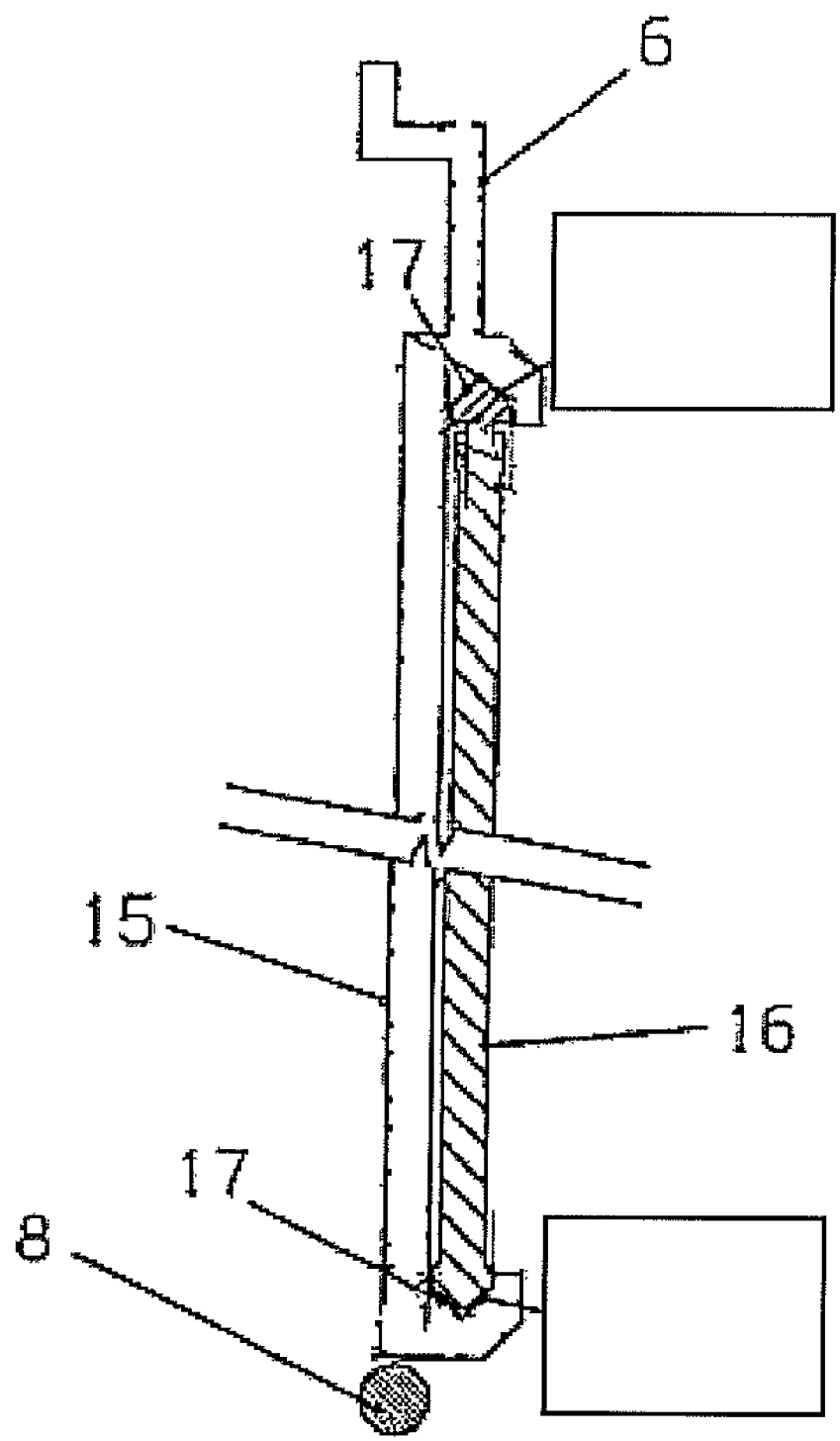
FIG. 3 a sectional view approximately along the line A-A in FIG. 2.

FIG. 2 shows a reinforcement insert 6, substantially made of injection molded plastic, which comprises a U-shaped wire stabilizer 8, in order to avoid torsions in the outer portion 7, wherein said wire stabilizer 8 is attached at the clip-in locations 9. In the support portion 10, the support pin 3 integrally molded with the support insert 6 is reinforced by a wire bar 11, which is inserted, in order to comply with crash safety requirements. The reinforcement insert 6 comprises an axle receiver portion 12 for the axle 13 of the bolt down unit 4 and a catch spring 14 for the slide-/catch moment. Since the reinforcement insert 6 is mostly intended for an anti-glare body half-shell system, the mirror 15 with the slide 16 is preassembled according to the sectional view A-A, like the bolt down unit 4.

According to the invention, the mirror is injection molded from high precision plastic material. A method for producing plastic glass is described in EP 14 12 158 A1. The method facilitates a high level of dimensional accuracy as required for a mirror support. The plastic glass support is processed in further steps after demolding. The mirror layer is deposited on the carrier material and protected by a protection layer.

The upper and lower V-type guide 17 for the slide 16 thus extends almost over the entire length of the reinforcement insert 6. Said guide 17 is directly integrally molded, when injection molding the plastic glass, and is comprised of the same material.

The slide 16 is an injection molded plastic part with approximately rectangular shape, with a handle bar 18 and with a configuration of an upper and a lower V-type- or inverted V-shaped rim edge.

The upper and the lower V-type rim edge at the slide 16, and the upper and lower V-type guide 17 of the mirror 15 in combination and the accurate dimensional matching, on the one hand, provide an optimum slide-/glide effect and, on the other hand, a rattle- and clearance free pairing, due to the particular shape of the glide- and guide zones.

Figure 4:
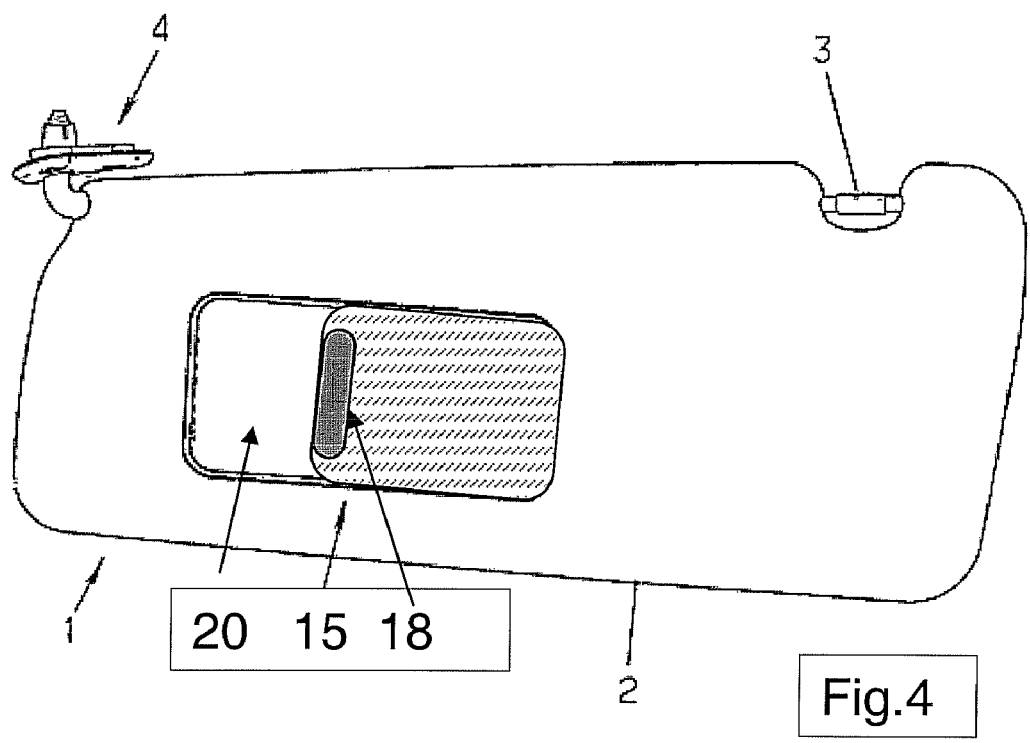
FIG. 4 a second embodiment of the invention.
Figure 5:
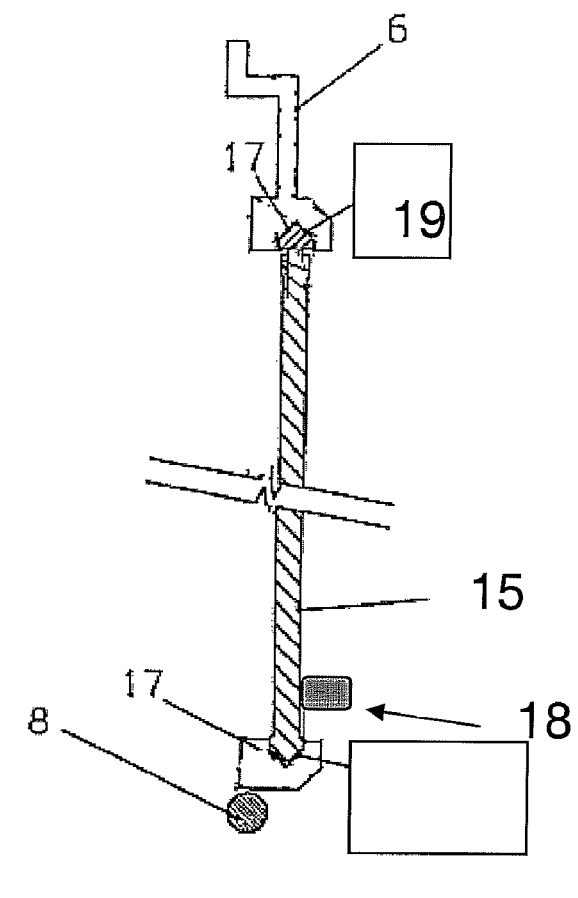
FIG. 5 a sectional view of the embodiment according to FIG. 4.
Figure 6:
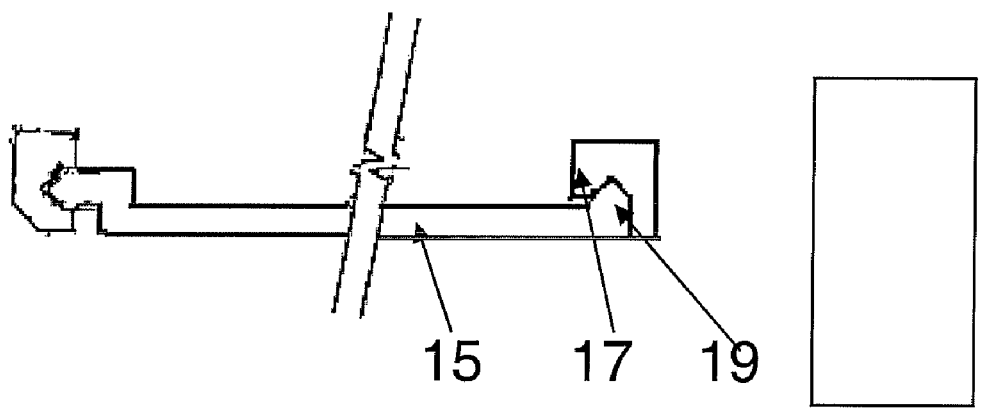
FIG. 6 a sectional view with alternative guides.

FIG. 4 shows another embodiment of the sun visor according to the invention. The sun visor body 1 comprises a recess 20, which is defined by guides. The plastic mirror 15 is concealed in the resting position behind the sun visor body. An integrally molded handle 18 on the mirror allows the user to pull the mirror to the right from a pocket shaped receiver of the sun visor body. The plastic glass mirror comprises in addition to a mirror surface a handle and integrally molded guide elements in the form of lugs 19, which engage the guides 17. The shape of the lugs 19 can be in line with the extension of the mirror surface as illustrated in FIG. 5, or it can be located like in an embodiment according to FIG. 6 in a lug perpendicular to the mirror surface or in an elbow bar.

Figure 7:
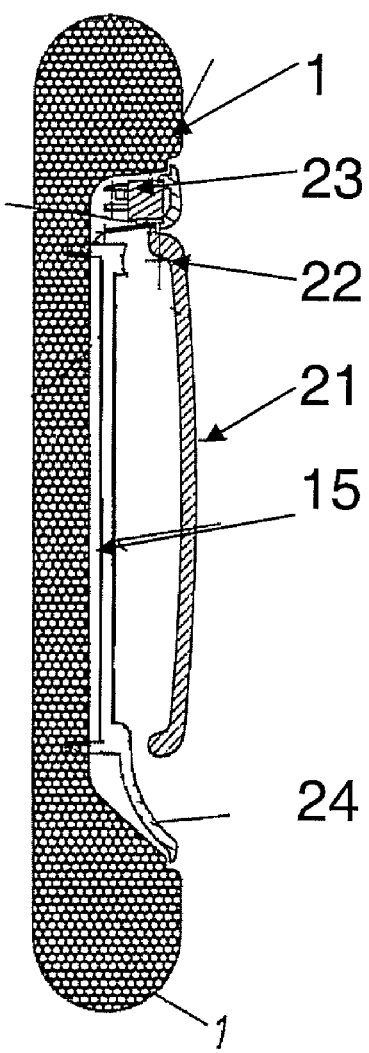
FIG. 7 a third embodiment.

For the invention, the type of guides is not relevant. Any type of guides, which is available for a person skilled in the art, is suitable for carrying out the invention. FIG. 7 illustrates another embodiment with a cover flap 21, which is mounted at a link 22. The flap is pivotably supported. The plastic glass mirror 15 is comprised of the planar mirror surface in combination with an integrally injection molded link 22 and an integrally injection molded tub shaped frame 24.

Also, in this embodiment it is important that the plastic glass fulfills several functions, thus providing a mirror surface, and the guide elements for concealing the mirror in the sun visor.

Figure 8:
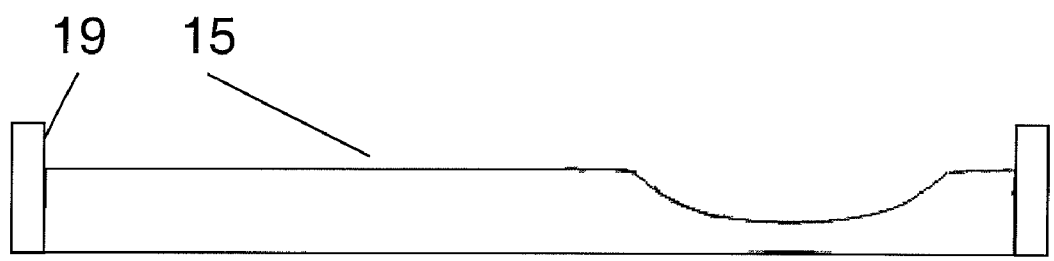
FIG. 8 an embodiment of a mirror.

FIG. 8 shows an embodiment with a planar and a cambered mirror component. This shape can be produced with plastic glass in one production step. In the figure, the lugs to be received in a guide 17 are only indicated.

The plastic glass comprises a planar backside in this embodiment in order to facilitate the installation in a sun visor.

| Reference Numerals and Designations | |
|---|---|
| 1 | sun visor |
| 2 | sun visor body |
| 3 | support pin |
| 4 | bolt down unit |
| 5 | mirror system |
| 6 | reinforcement insert |
| 7 | outer portion |
| 8 | wire stabilizer |
| 9 | clip-in location |
| 10 | support portion |
| 11 | wire bar |
| 12 | axle receiver portion |
| 13 | axle |
| 14 | catch spring |
| 15 | mirror |
| 16 | slide |
| 17 | guide |
| 18 | handle bar |
| 19 | lug |
| 20 | recess |
| 21 | cover flap |

| Reference Numerals and Designations | |
|---|---|
| 22 | link |
| 23 | switch |
| 24 | integrally injected molded frame |

What is claimed is:

1. A sun visor comprising:
   a sun visor body;
   a mirror defining an upper side and a lower side;
   a mirror surface extending between said upper and lower sides;
   guide elements extending out from said upper and lower sides of said mirror; and
   a slide slidably engaged with said guide elements for selectively concealing said mirror surface, wherein said sun visor body, said mirror and said guide elements are all fabricated from a unitary construction during a single injection molding process.

2. A sun visor according to claim 1, wherein said guide elements are shaped as grooves integrally molded at said upper and lower sides of said mirror to receive said slide therein allowing said slide to run.

3. A sun visor according to claim 1, wherein said mirror surface is reflective on its front side.

4. A sun visor according to claim 1, wherein said mirror includes a portion having a concave shape.

5. A sun visor comprising:
   a sun visor body;
   a mirror defining an upper side and having lugs extending out from said upper side;
   a mirror surface extending down from said upper side, said mirror surface defining a lower side; and
   a cover flap pivotally secured to said lugs for selectively concealing said mirror, wherein said sun visor body, said mirror and said guide elements are all fabricated from a unitary construction during a single injection molding process.

6. A sun visor comprising:
   a sun visor body;
   a mirror defining an upper side and a lower side;
   guide elements extending out from said upper and lower sides of said mirror; and
   a slide slidably engaged with said guide elements for selectively concealing said mirror, said slide including upper and lower V-type rim edges for slidably engaging said guide elements wherein said sun visor body, said mirror and said guide elements are all fabricated from a unitary construction during a single injection molding process.

7. A sun visor according to claim 6, wherein said guide elements are shaped as grooves integrally molded at said upper and lower sides of said mirror to receive said slide therein allowing said slide to run.

8. A sun visor according to claim 6, wherein said mirror includes a portion having a concave shape.

* * * * *